_United States Patent Office_

2,984,691
Patented May 16, 1961

2,984,691

TELOMERIZATION PROCESS

Peter Fotis, Jr., Highland, Ind., assignor to Standard Oil Company, Chicago, Ill., a corporation of Indiana No Drawing. Filed Sept. 30, 1954, Ser. No. 459,513

4 Claims. (Cl. 260—668)

This invention relates to a novel catalytic process for the telomerization of vinyl olefins such as ethylene with certain aromatic compounds which are substituted by at least one saturated monovalent hydrocarbon radical.

In one specific aspect, my invention relates to a novel catalytic process for the telomerizing addition of an olefin such as ethylene in the side chain of an aromatic compound wherein an aromatic nucleus is substituted by a saturated monovalent hydrocarbon radical and wherein the carbon atom of said radical which is directly attached to a nuclear carbon atom, i.e. the so-called alpha carbon atom, is also attached to one or more hydrogen atoms. The addition reactions in question may be illustrated by the following equation:

$$\text{Ar}-\underset{R_2}{\underset{|}{\overset{R_1}{\overset{|}{C}}}}-H + nCH_2=CH_2 \xrightarrow{\text{catalyst}} \text{Ar}-\underset{R_2}{\underset{|}{\overset{R_1}{\overset{|}{C}}}}-(CH_2CH_2)_nH$$

wherein $n$ is an integer of two or more, ethylene is illustrative of vinyl olefins, Ar is an aromatic nucleus, C is the alpha-carbon atom bonded directly to a carbon atom of said nucleus, $R_1$ and $R_2$ are the same or different substituents and can be hydrogen, an alkyl radical, a cycloalkyl radical or an aryl radical (or derivatives thereof); and $R_1$ and $R_2$, together with the alpha-carbon atom, may constitute a cycloalkyl radical such as a cyclopentyl or cyclohexyl radical. From the foregoing description it will be clear that the aromatic compound which is converted by my process contains only aromatic carbon-carbon double bonds and not the highly reactive carbon-carbon double bonds of the nature of those which occur in alkenes or cycloalkenes.

The term "vinyl olefin" is intended to define olefins having the structure $CH_2=CH-R$, wherein $CH_2=CH-$ constitutes the vinyl group and R is selected from the class consisting of hydrogen and monovalent hydrocarbon radicals free of ethylenic unsaturation, e.g., alkyl, cycloalkyl, aryl and the like.

The sense in which the terms "telomerization" and "telomerizing addition" are used herein has been defined by W. E. Hanford and D. E. Sargent, "Organic Chemistry—An Advanced Treatise," edited by Henry Gilman et al., vol 4, pages 1044–5 (published by John Wiley and Sons, Inc., N.Y. (1953)):

"When the reaction conditions were favorable for more than one molecule of ethylene, or other polymerizable olefinic compound, to react with one molecule of carbon tetrachloride, the reaction was designated as 'telomerization' (derived from Greek *telos*, meaning 'end' plus Greek *mer*, meaning 'part').[303] Telomerization was formally defined in the following manner: 'the process of reacting under polymerization conditions, a molecule YZ which is called a "telogen" with more than one unit of a polymerizable compound having ethylenic unsaturation called a "taxogen" to form products called 'telomers' having the Formula $Y(A)_nZ$, where $(A)_n$ is a divalent radical formed by chemical union, with the formation of new carbon bonds, $n$ being any integer greater than one, and Y and Z being fragments of the telogen attached to the terminal taxogens.' Thus in the ethylene-carbon tetrachloride system, ethylene is the 'taxogen,' carbon tetrachloride the 'telogen,' and the tetrachloroalkanes ($C_5$ and above) 'telomers.'

"The difference between telomerization and interpolymerization is apparent when the structure of the products obtained in the two processes, telomers and interpolymers, is considered. Telomers are made of several polymerized molecules of a polymerizable substance and the fragments of only *one* other molecule. Interpolymers contain a number of each of two or more different monomer units in their structures but do not contain such fragments.

"Telomerization differs from simple addition to a double bond in that *more than one molecule* of the polymerizable substances appear in the product, i.e.,

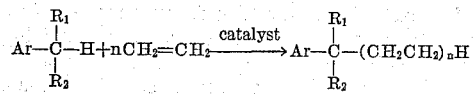

[303] Hanford and Joyce, U.S. Patent 2,440,800.

From the foregoing definition it will also be clear that telomerization is a reaction which is entirely distinct from the alkylation reactions of olefins, wherein the net effect of the process is to interpolate one molecule of the olefin between a carbon atom and an attached hydrogen atom in the compound which is being alkylated.

The distinctions between telomerizing additions of olefins and alkylation reactions effected with olefins will be further clarified by reference to the following specific illustrations. The telomerizing addition of ethylene to toluene results in the production of 1-phenylpentane, 1-phenylheptane and higher telomers. On the other hand, the alkylation of the methyl group in toluene by ethylene results in the production of 1-phenylpropane, 3-phenylpentane and 3-ethyl-3-phenylpentane by the addition of 1, 2 and 3 molecules of ethylene, respectively, to the side chain. In the case of isopropylbenzene telomerization with ethylene, the first telomerization product is 2-methyl-2-phenylhexane and the addition of one more molecule of ethylene yields 2-methyl-2-phenyloctane. On the other hand, the alkylation of isopropylbenzene with ethylene leads to only one product, viz. 2-methyl-2-phenylbutane.

Telomerization reactions such as are hereinafter described have previously been achieved under severe operating conditions through the use of certain free radical-forming catalysts such as ketaldones and the like (U.S.P. 2,432,381 of D. D. Coffman and John R. Roland, patented Dec. 9, 1947). Processes for the alkylation of toluene and similar aromatics with ethylene and the like in the presence of metallic sodium have also been described and it has been suggested that other members of the alkali metal subgroup could be substituted for sodium in this type of alkylation process (Gerald M. Whitman, U.S.P. 2,448,641, patented Sept. 7, 1948).

One object of my invention is to provide a novel catalytic process for effecting the telomerizing addition of vinyl olefins, or materials furnishing such olefins under the reaction conditions, to a compound comprising an aromatic nucleus, and at least one hydrogen atom attached to the alpha-carbon atom of said radical. Another object is to provide a highly effective telomerization catalyst. An additional object of my invention is to provide a supported lithium telomerization catalyst of great catalytic activity. A further object of my invention is to provide a facile and economic process for the synthesis of 1-arylalkanes, particularly 1-phenylalkanes. The above and additional objects and advantages of my invention will become apparent from the following description thereof.

Briefly, I have discovered that lithium differs from the other alkali metals in functioning as an effective catalyst for the telomerization reactions whose general character has been described above. The lithium may be employed in various forms, sizes and shapes, as finely divided dispersions in chemically inert liquid diluents or supported and extended upon various solid materials in order to increase the surface area of lithium which is available to the reactants. The lithium is employed in a catalytic proportion of at least about 0.1 weight percent, based on the weight of the aromatic reactant, and usually in proportions between about 2 and about 5 weight percent. The molar ratio of the aromatic reactant to the olefin charging stock can range upwardly from about 0.01 and is usually selected within the range of about 0.1 to about 1, for example, about 0.5, depending upon the reactivity of the particular reagents and the particular telomers which are sought as principal products. The telomerizing addition reaction is effected at temperatures within the general range of about 100° C. to about 400° C. More often temperatures in the range of about 190 to about 350° C. are used with unsupported lithium catalysts. Temperatures in the range of about 150° C. to about 300° C. with finely divided lithium dispersions in inert liquid materials or with lithium carried upon a solid supporting material can be used.

A wide variety of aromatic feed stocks can be employed in the present process. In the general formula of suitable aromatic feed stocks:

Ar represents an aryl nucleus which may be either carbocyclic or a stable heterocyclic aromatic nucleus. Examples of the carbocyclic aromatic nucleus include the benzene, naphthalene, tetralin, indane, phenanthrene, anthracene, pyrene nuclei and the like. Examples of stable heterocyclic aromatic nuclei include those of pyridine, quinidine, pyrrole, benzothiophene, thiophene and the like.

$R_1$ and $R_2$ may be the same or different and may be selected from the class consisting of hydrogen and various alkyl radicals: for example, methyl, ethyl, propyl, isopropyl, butyl, isobutyl, t-butyl, amyl, dodecyl, benzyl, etc.; cycloalkyl radicals, such as: cyclopentyl, cyclohexyl, methylcyclopentyl, ethylcyclohexyl, methylcyclohexyl, phenylcyclohexyl, p-cyclohexylcyclohexyl, and the like; aryl radicals, such as: phenyl, xenyl, naphthyl, anthracyl, tolyl, ethylphenyl, cyclohexylphenyl, and the like; and $R_1$ and $R_2$ together with the alpha-carbon atom constitute a cycloalkyl radical, such as cyclopentyl, cyclohexyl, and the like.

Specific examples of suitable aromatic reactants containing a carbocyclic aromatic nucleus in the present telomerization process include various alkylbenzenes, such as toluene, ethylbenzene, n-propylbenzene, isopropylbenzene, mesitylene, pseudocumene, hemimellitene, prehnitene, pentamethylbenzene, hexamethylbenzene, isodurene, durene, n-butylbenzene, isobutylbenzene, p-cymene, p-diisopropylbenzene, para-di-t-butylbenzene, 1-, 2-, or 3-phenyldodecane; cycloalkylbenzenes, such as cyclopentylbenzene, cyclohexylbenzene, p-cyclohexyltoluene, and the like. Analogous compounds derived from other carbocyclic aromatic nuclei can be employed, for example, analogous derivatives of naphthalene, phenanthrene, anthrene, etc. The telomerization process of this invention can also be practiced with compounds containing a heterocyclic aromatic nucleus, at least one saturated monovalent hydrocarbon substituent and at least one hydrogen atom bound to the alpha-carbon atom, for example, such compounds as 2-, 3-, or 4-methylpyridine, the corresponding ethyl, propyl, butyl, octyl, and similar derivatives, and also similar derivatives of quinoline, thiophene, benzothiophene and the like. It will be understood that the specific feed stocks named hereinabove are intended as illustrations only and are not considered as being limitative of the scope of the present invention.

The olefinic reactant in the telomerization reactions is a vinyl olefin. I particularly prefer to use ethylene, but the invention can be practiced with higher olefins of the vinyl olefin class, for example, normally gaseous 1-alkenes, normally liquid 1-alkenes, aryl-alkenes such as styrene, and the like. In lieu of a 1-olefin I may employ material affording the same under the reaction conditions, for example, a 2-alkene which isomerizes to some extent under the reaction conditions to produce a vinyl olefin which then enters into the telomerization reaction, thereby displacing the isomerization equilibrium in favor of the continued production of the vinyl olefin.

It will be appreciated that the practice of this invention is not restricted to individual hydrocarbons, but that mixtures of the aromatic compounds or mixtures of the olefins, or feed stocks which are mixtures both with respect to the aromatic compound and the olefin may be employed in the practice of this invention.

The lithium catalyst may be employed in the form of ribbon, chunks, wire, or other physical form. In general, lithium exhibits maximum catalytic activity when the surface of the lithium which is exposed to the reacting mixture is at a maximum. Therefore it is advantageous to employ lithium in the form of a powder or dust, or as a finely divided or colloidal dispersion in an inert medium such as a saturated hydrocarbon or mixtures thereof, as in petroleum white oils or the like.

Molten lithium can be deposited on solid supporting materials which serve to increase the surface of lithium presented to the reacting mixture. Thus, molten lithium can be coated upon non-porous materials, which are used, for example, in powder form, such as alundum, silicon carbide, sodium chloride or other metal halides, glass beads, quartz fragments, and the like. The lithium may also be coated upon porous adsorbent materials such as various metal oxide powders or gels, particularly upon porous adsorbents such as activated (gamma-) aluminas, silica gel, titania, zirconia, activated adsorbent clays, synthetic alumina-silica composites such as are employed in the catalytic cracking of high boiling hydrocarbon oils to produce gasoline, activated carbons, such as an activated coconut charcoal, or the like. The fragments or powder of the supporting material is mechanically stirred or fluidized with an inert gas, such as helium, and molten lithium is introduced thereinto to provide a relatively uniform coating. The concentration of lithium relative to the supporting material can be between about 1 and about 50% and is usually between about 5 and about 25 weight percent. In lieu of pre-forming supported lithium, I can add lithium and a solid supporting material separately to the reaction zone.

The telomerization reactions are effected in the presence of a catalytic proportion of lithium, which ranges upwardly from about 0.1 weight percent, based on the aromatic feed stock which is converted with the olefin, but which may range upwardly to about 10 weight percent, 20 weight percent, or even higher proportions when relatively rapid rates of reaction are desired. Usually the concentration of lithium relative to the aromatic feed component is between about 0.1 and about 10 weight percent, most often between about 2 and about 5 weight percent.

The telomerization reactions can be effected over a broad temperature range, depending upon the identity of the reactants, the desired rate of reaction and the other variables which enter into the reaction such as the catalyst concentration, the concentration of the olefin relative to the aromatic feed component, degree of dispersion of catalyst, etc. When lithium is employed in finely divided or colloidal form, the reaction temperature may range upwardly from about 100° C. and is usually within the range of about 150 to about 300° C. About the same temperature range is applicable when lithium is employed in the form of a dispersion upon the solid supporting material. In order to obtain comparable telomerization reaction rates with lithium employed in the form of wire, ribbon or chunks, it may be necessary to employ somewhat higher temperatures ranging up to about 400° C., more often in the range of about 190° C. to 350° C.

When a normally gaseous olefin such as ethylene or propylene is employed, its partial pressure in the telomerization reaction zone may range upwardly from about atmospheric pressure and may be in the range of about 1 to about 1000 atmospheres, more often between about 25 and about 500 atmospheres.

It will be appreciated that the process of the present invention can be practiced under a very broad range of conditions with corresponding breadth in the nature of the products which can be produced. Thus, the telomerizing addition of ethylene to toluene can be carried out under relatively low pressures of the order of about 500 to about 2000 p.s.i. to produce 1-phenylalkanes in which the alkyl groups are predominantly amyl, heptyl and nonyl; on the other hand, at high pressures of the order of, say, 10,000 p.s.i. of ethylene, even wax-like products can be produced by the telomerizing addition of ethylene to the methyl side chain in toluene and similar alkylbenzene feed stocks.

The telomerization reaction may be effected in the presence of reaction solvents or diluents, which are preferably substantially inert under the reaction conditions, for example, alkanes or cycloalkanes.

The following examples are introduced in order specifically to illustrate my invention. The exemplary operations were performed in a stainless steel-lined autoclave of 250 ml. capacity provided with a magnetically-actuated reciprocating stirrup-type stirrer.

*Example 1*

The reactor was charged with 0.47 mol of toluene, 0.075 mol of lithium (chunks), flushed with nitrogen and then pressure-tested with hydrogen. Ethylene (0.5 mol) was then introduced into the reactor and the contents were heated to 250° C., which temperature was maintained for 25 hours. The initial ethylene partial pressure was 965 p.s.i. The reactor was then allowed to cool to room temperature, gases were vented and the liquid products were worked up by distillation. It was found that about 0.31 mol of ethylene was consumed in the reaction. The analysis of the liquid telomerization products was as follows:

| | Vol. percent |
|---|---|
| n-Propylbenzene | 40.0 |
| 1-phenylpentane | 13.4 |
| 1-phenylheptane | 13.4 |
| Bottoms | 33.2 |

*Example 2*

The reactor was charged with 0.36 mol of isopropylbenzene ($n_D^{20}$, 1.4190), 0.075 mol lithium (chunks), and the reactor was flushed and pressure-tested as in Example 1. Then 0.75 mol of ethylene was introduced into the reactor and the contents were heated with stirring to 250° C. and maintained at this temperature for 19 hours. The maximum pressure in the reactor was 1350 p.s.i. and the pressure drop was 825 p.s.i. The reactor was cooled to room temperature and gases were bled off. It was found that 0.536 mol of ethylene was consumed.

The volume of liquid product was 52 ml. and its refractive index ($n_D^{20}$) was 1.4847, indicating that at least two ethylene molecules had entered into a telomerization reaction with the cumene molecule. In addition, two solid products were isolated, one of which was insoluble in xylene at room temperature (2.5 g.) and another solid which was soluble in xylene at room temperature (0.5 g.).

The products of this invention are suitable for many uses, for example, as components of high octane number piston engine fuels, as components of jet fuels, and as chemical intermediates. Thus, the products of this invention can be subjected to a large variety of reactions such as halogenation, sulfonation, nitration, sulfonylation, and the like to produce numerous derivatives of value in the chemical industry. The alkylbenzene sulfonates, particularly those in which the phenyl group is in positions 1, 2 or 3 of the alkane group, and in which the alkane group contains from about 12 to about 15 carbon atoms, inclusive, are especially desirable materials for sulfonation and neutralization to produce components of synthetic detergent compositions. The alkylnaphthalenes derived from mono- or di-methyl naphthalenes and ethylene is accordance with this invention, containing side chains (total) of about 20 to 25 carbon atoms, inclusive, may be employed in pour point depressant compositions for hydrocarbon oils which contain waxes. Numerous other uses for the various telomerization products will readily suggest themselves to those skilled in the art.

Having thus described my invention, what I claim is:

1. A process for the telomerizing addition of a vinyl olefin to an aromatic compound substituted by a saturated hydrocarbon radical having only one hydrogen atom attached to the alpha carbon atom of said radical, said aromatic compound having the formula

wherein Ar is an aromatic nucleus and $R_1$ and $R_2$ are hydrocarbon radicals selected from the group consisting of alkyl, cycloalkyl and aryl radicals, and $R_1$ and $R_2$ together with the alpha carbon atom may constitute a cycloalkyl radical, which process comprises contacting said aromatic compound with said olefin in the presence of a catalytic proportion of an added catalyst consisting essentially of lithium under suitable conditions for effecting telomerization comprising a temperature of at least about 100° C., and recovering a telomerization product thus produced.

2. The process of claim 1 wherein said aromatic compound is an alkylbenzene and said vinyl olefin is ethylene.

3. The process of claim 1 wherein said aromatic compound is an alkylbenzene.

4. The process of claim 2 wherein said alkylbenzene is isopropylbenzene.

References Cited in the file of this patent

UNITED STATES PATENTS

| 2,186,022 | Holm et al. | Jan. 9, 1940 |
| 2,448,641 | Whitman | Sept. 7, 1948 |
| 2,636,910 | Crouch | Apr. 28, 1953 |
| 2,728,802 | Closson et al. | Dec. 27, 1955 |